(12) United States Patent
Tran

(10) Patent No.: US 10,850,255 B2
(45) Date of Patent: Dec. 1, 2020

(54) SYNTHESIZING HIGHLY POROUS NANOPARTICLES

(71) Applicant: UNITED STATES GOVERNMENT AS REPRESENTED BY THE SECRETARY OF THE ARMY, Adelphi, MD (US)

(72) Inventor: Dat Tien Tran, Clarksville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 304 days.

(21) Appl. No.: 15/803,875

(22) Filed: Nov. 6, 2017

(65) Prior Publication Data
US 2019/0134598 A1 May 9, 2019
US 2020/0269209 A9 Aug. 27, 2020

Related U.S. Application Data

(60) Provisional application No. 62/434,543, filed on Dec. 15, 2016.

(51) Int. Cl.
*B01J 20/06* (2006.01)
*C01G 53/00* (2006.01)
(Continued)

(52) U.S. Cl.
CPC .............. *B01J 20/06* (2013.01); *B01D 53/02* (2013.01); *B01D 53/04* (2013.01); *B01J 6/001* (2013.01);
(Continued)

(58) Field of Classification Search
CPC .............. B01J 20/06; B01J 2219/00159; B01J 20/28007; B01J 20/28016; B01J 20/3057; B01J 20/3078; B01J 13/0065; B01J 6/001; C01G 53/40; C01G 9/02; H01M 8/0675; C01P 2002/54; C01P 2004/64; C01P 2002/72; C01P 2004/04; C01P 2004/03; B01D 2253/304; B01D 53/02; B01D 2253/1124; B01D 2257/304; B01D 53/04

See application file for complete search history.

(56) References Cited

PUBLICATIONS

Tran, Dat T. "Synthesis of porous ZnO based materials using an agarose gel template for H 2 S desulfurization." RSC Advances 6.2 (2016): 1339-1345.*

(Continued)

*Primary Examiner* — Richard M Rump
(74) *Attorney, Agent, or Firm* — Emily C. Moscati; Robert Thompson

(57) ABSTRACT

A system and method for synthesizing a nanoparticle material includes dissolving a metal nitrate in deionized water, adding a hydrogel precursor in the deionized water containing the dissolved metal nitrate to create an aqueous solution, heating the aqueous solution, cooling the aqueous solution to create a solid gel, and calcinating the solid gel to create a metal oxide nanoparticle material. The metal oxide nanoparticle material may include a zinc oxide-based nanoparticle material. The hydrogel precursor may include an agarose gel. The solid gel may be calcinated at approximately 600° C. The solid gel may be calcinated for approximately five hours in the presence of air. The aqueous solution may be heated to a boil. The aqueous solution may be heated at a temperature of ≤100° C.

2 Claims, 13 Drawing Sheets

(51) Int. Cl.
  *B01J 20/28* (2006.01)
  *B01J 20/30* (2006.01)
  *B01J 13/00* (2006.01)
  *B01J 6/00* (2006.01)
  *H01M 8/0662* (2016.01)
  *B01D 53/04* (2006.01)
  *C01G 9/02* (2006.01)
  *B01J 20/34* (2006.01)
  *B01D 53/02* (2006.01)
  *C01B 13/18* (2006.01)

(52) U.S. Cl.
  CPC ..... *B01J 13/0065* (2013.01); *B01J 20/28007* (2013.01); *B01J 20/28016* (2013.01); *B01J 20/28019* (2013.01); *B01J 20/28059* (2013.01); *B01J 20/28071* (2013.01); *B01J 20/3057* (2013.01); *B01J 20/3078* (2013.01); *B01J 20/3085* (2013.01); *B01J 20/3433* (2013.01); *B01J 20/3483* (2013.01); *C01B 13/18* (2013.01); *C01G 9/02* (2013.01); *C01G 53/40* (2013.01); *H01M 8/0675* (2013.01); *B01D 2253/1124* (2013.01); *B01D 2253/304* (2013.01); *B01D 2257/304* (2013.01); *B01J 2219/00159* (2013.01); *C01P 2002/54* (2013.01); *C01P 2002/60* (2013.01); *C01P 2002/72* (2013.01); *C01P 2004/03* (2013.01); *C01P 2004/04* (2013.01); *C01P 2004/64* (2013.01); *C01P 2006/12* (2013.01); *C01P 2006/14* (2013.01)

(56) References Cited

PUBLICATIONS

Nagarajan, Sangeetha, and Kumaraguru Arumugam Kuppusamy. "Extracellular synthesis of zinc oxide nanoparticle using seaweeds of gulf of Mannar, India." Journal of nanobiotechnology 11.1 (2013): 39.*

Ma, Xing, et al. "Aqueous route synthesis of mesoporous ZrO 2 by agarose templation." Journal of the American Ceramic Society 95.11 (2012): 3455-3462.*

* cited by examiner

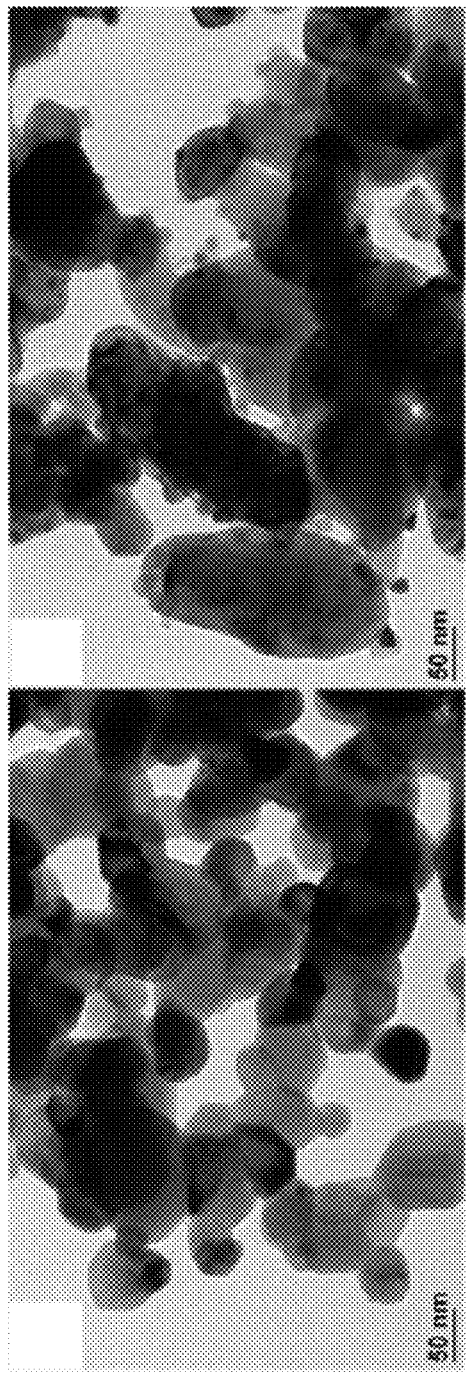

SYNTHESIZING HIGHLY POROUS NANOPARTICLES

CROSS REFERENCE TO RELATED APPLICATION

This application claims the benefit of U.S. Provisional Patent Application No. 62/434,543 filed on Dec. 15, 2016, the contents of which, in its entirety, is herein incorporated by reference.

GOVERNMENT INTEREST

The embodiments described herein may be manufactured, used, and/or licensed by or for the United States Government without the payment of royalties thereon.

BACKGROUND

Technical Field

The embodiments herein generally relate to nanotechnology, and more particularly to a nanoparticle formulation.

Description of the Related Art

Type III/V materials are of interest in a variety of application including electronics, detectors and sensors. One persistent challenge is the limitation of surface oxides of the III/V materials that may be conducting and may result in unwanted leakage current, dark current or surface conductivity in various applications. These surface oxides may be present initially or may be present after prolonged exposure to oxygen in the environment. $H_2S$ gas is not only harmful to the environment, but also corrosive to metals and poisonous to fuel reformer and fuel cell catalysts. Removal of $H_2S$ is an important step in fuel processing technology. Sorbent materials in the form of nanoparticles may be used to remove the $H_2S$.

SUMMARY

In view of the foregoing, an embodiment herein provides a method for synthesizing a nanoparticle material, the method comprising dissolving a metal nitrate in deionized water; adding a hydrogel precursor in the deionized water containing the dissolved metal nitrate to create an aqueous solution; heating the aqueous solution; cooling the aqueous solution to create a solid gel; and calcinating the solid gel to create a metal oxide nanoparticle material. The metal oxide nanoparticle material may comprise a zinc oxide-based nanoparticle material. The hydrogel precursor may comprise an agarose gel. The method may comprise calcinating the solid gel at approximately 600° C. The method may comprise calcinating the solid gel for approximately five hours in the presence of air. The method may comprise heating the aqueous solution to a boil. The method may comprise heating the aqueous solution at a temperature of <100° C. The method may comprise dissolving an approximately 4 wt % nickel nitrate precursor in the deionized water with the metal nitrate and the hydrogel precursor. The method may comprise cooling the aqueous solution at room temperature. The method may comprise cutting the solid gel prior to calcinating.

Another embodiment provides a system for synthesizing a nanoparticle material, the system comprising a first container comprising an aqueous solution containing a hydrogel precursor and deionized water comprising a dissolved metal nitrate; a first heat source to heat the aqueous solution; a second container to hold the aqueous solution during a cooling process to create a solid gel; and a second heat source to calcinate the solid gel to create a metal oxide nanoparticle material. The metal oxide nanoparticle material may comprise a zinc oxide-based nanoparticle material. The hydrogel precursor may comprise an agarose gel. The second heat source may calcinate the solid gel at approximately 550° C. to 650° C. The second heat source may calcinate the solid gel for approximately five hours in the presence of air. The first heat source may heat the aqueous solution to a boil. The first heat source may heat the aqueous solution at a temperature of <100° C. The first container may comprise an approximately 4 wt % nickel nitrate precursor dissolved in the deionized water with the metal nitrate and the hydrogel precursor. The second container may cool the aqueous solution at room temperature. The system may comprise a third container to hold the solid gel for calcination.

Reference herein to an "as-synthesized" material refers to the materials synthesized in accordance with the techniques provided by the embodiments herein.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 6A is a transmission electron microscope (TEM) image of as-synthesized ZnO;

FIG. 6B is a TEM image of as-synthesized Ni-doped ZnO;

DETAILED DESCRIPTION

Figure 1:
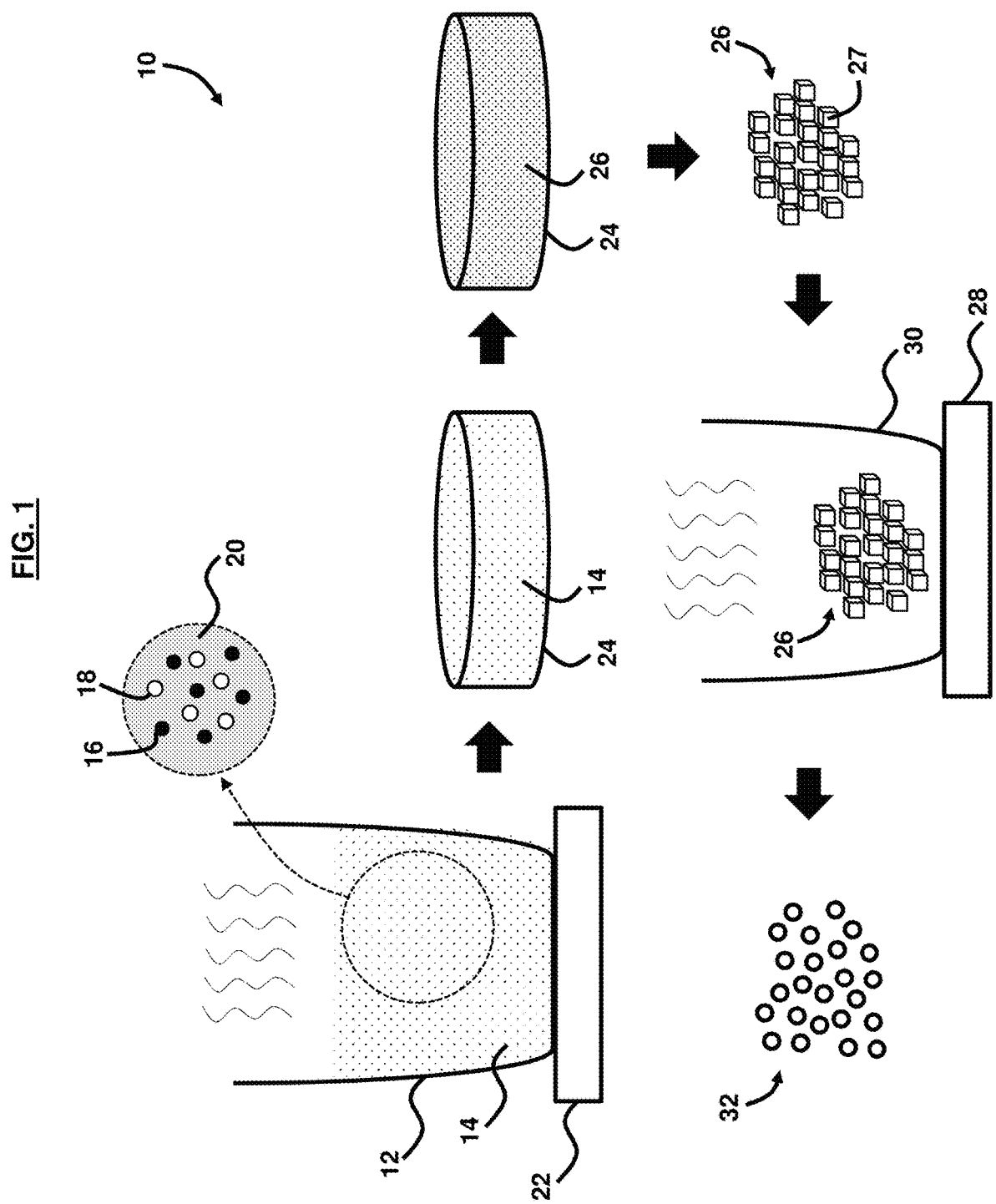
FIG. 1 is a schematic diagram illustrating a system for synthesizing nanoparticles, according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a method for a one-pot synthesis and characterization of pure ZnO (>99%) and Ni-doped ZnO materials using agarose gel as a template for hydrogen sulfide desulfurization. The embodiments herein provide a method of synthesis of large scale ZnO-based materials by preparing pure ZnO and metal-doped ZnO for gas phase $H_2S$ desulfurization in logistic fuel reformation for fuel cell applications. The method allows for the production of many ZnO-based and/or other metal oxides-base materials at a large scale, the use of low temperature (e.g., ≤100° C.) with low cost equipment such as a hot plate or microwave, the production of highly porous metal oxides using agarose gel as a template, the control of metals/metal-oxides nanoparticles dispersed on support materials in a one-pot synthesis, the enabling of an inexpensive way to make a large amount of materials in an aqueous medium without using any expensive equipment or expensive organic solvents. Referring now to the drawings, and more particularly to FIGS. 1 through 10, there are shown exemplary embodiments.

FIG. 1 illustrates a system 10 for synthesizing a nanoparticle material 32, the system 10 comprising a first container 12 comprising an aqueous solution 14 containing a hydrogel precursor 16 and deionized water 18 comprising a dissolved metal nitrate 20. In an example, the hydrogel precursor 16 may comprise Agarose, Type II-A, Medium EEO, white powder available from Sigma-Aldrich® Company, Missouri, USA. Additional types of the hydrogel precursor 16 which may be used include other Agarose reagents such as Type I-B, low EEO; Type I, low EEO; Type I-A, low EEO, all available from Sigma-Aldrich® Company. Any type of metal sources may be used for the metal nitrate 20 so long as they are capable of dissolving in the deionized water 18 except for one that are strong oxidizing precursors. The embodiments provide for metal nitrate hydrates as exemplary materials for the metal nitrate 20. In one example, the metal nitrate 20 comprises zinc nitrate hexahydrate (reagent grade, 98%). The hydrogel precursor 16 may be dissolved in the deionized water 18 containing the metal nitrate 20 at approximately 80° C. to 100° C. As an example, 4 g of metal nitrate 20, with 30.0 mL of deionized water 18, and 0.70 g of hydrogel precursor 16 may be used.

A first heat source 22 is used to heat the aqueous solution 14. Here, the aqueous solution 14 may be either slowly heated (for example, by a hot plate, etc.) or quickly heated (for example, by a microwave, etc.). In the context of the embodiments herein, "slowly heated" may comprise heating at a temperature of approximately 90° C. to 100° C. for approximately 30-60 minutes on a hot plate, for example. Moreover, in the context of the embodiments herein, "quickly heated" may comprise heating at a temperature of approximately 90° C. to 100° C. for approximately 30-60 seconds in a microwave, for example. Next, after the aqueous solution 14 becomes clear it is transferred to a second container 24 (for example, a glass Petri dish, etc.), which is used to hold the aqueous solution 14 during a cooling process to create a solid gel 26. The cooling process may last between 10-60 minutes in an example or until the solid gel 26 reaches room temperature. In the context of the embodiments herein, room temperature may be approximately 20° C. to 25° C. In an example, the solid gel 26 may be cut into small cubes 27, which are then placed in a third container 30 (for example, a ceramic crucible, etc.). The small cubes 27 may be approximately 1 cm$^3$ in size, in one example.

A second heat source 28 is used to calcinate the solid gel 26 in the third container 30 to create a metal oxide nanoparticle material 32. The metal oxide nanoparticle material 32 may comprise a zinc oxide-based nanoparticle material. For ZnO nanoparticles that are approximately 30 nm to 100 nm in size, the nanoparticle material 32 may be a white powder. For Ni-doped ZnO nanoparticles, it may be a greenish powder. The nanoparticle materials 32 have high heat stability (e.g., >600° C.). Additionally, NiO nanoparticles may be approximately 10 nm to 20 nm in size. The hydrogel precursor 16 may comprise an agarose gel. The second heat source 28 may calcinate the solid gel 26 at approximately 600° C. at a ramp rate of 0.4° C./min and held at 600° C. for approximately five hours in the presence of air. The 600° C. temperature calcinates the solid gel 26 to its pure phase. The temperature range for the calcination may be between 550° C. and 650° C. according to the embodiments herein. Again, the second heat source 28 may calcinate the solid gel 26 for approximately five hours in the presence of air. The first heat source 22 may heat the aqueous solution 14 to a boil. The first heat source 22 may heat the aqueous solution 14 at a temperature of ≤100° C. The first container 12 may comprise an approximately 4 wt % nickel nitrate precursor 32 dissolved in the deionized water 18 with the metal nitrate 20 and the hydrogel precursor 16. The second container 24 may cool the aqueous solution 14 at room temperature. In the context of the embodiments herein, room temperature may be approximately 20° C. to 25° C.

Figure 2:
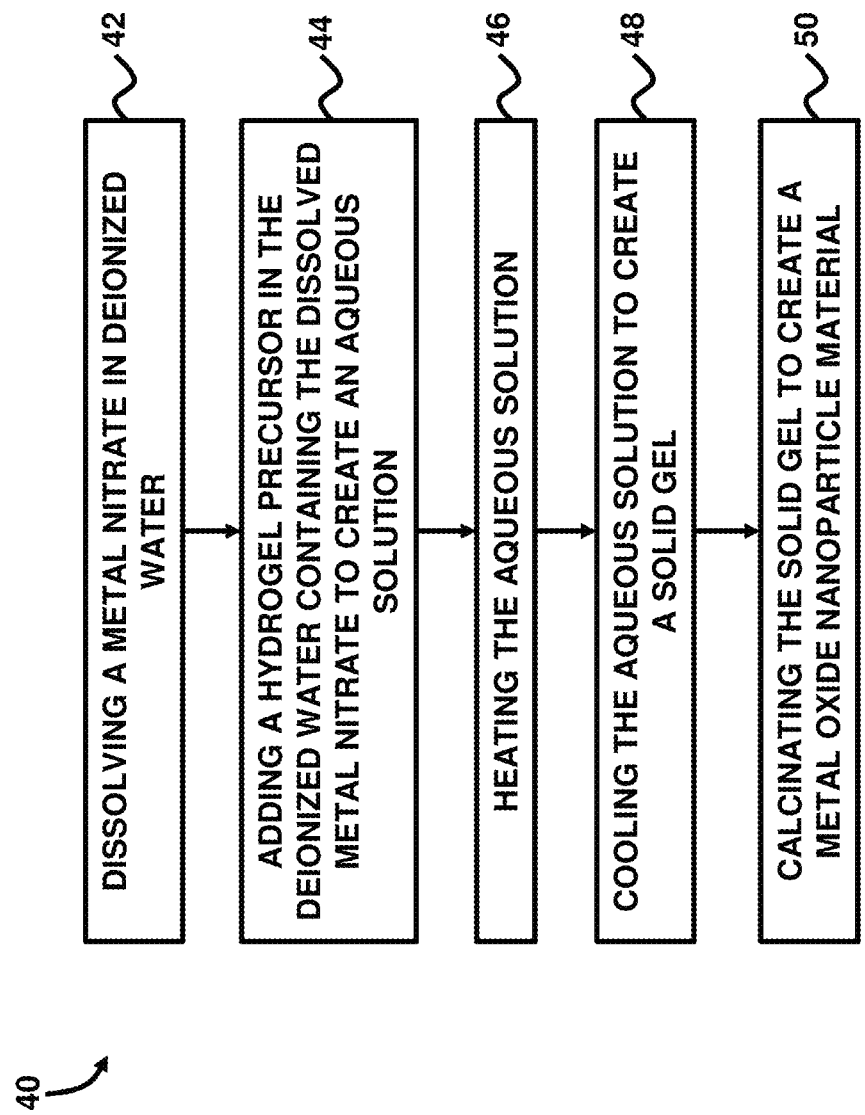
FIG. 2 is a flow diagram illustrating a method for synthesizing nanoparticles, according to an embodiment herein.

FIG. 2, with reference to FIG. 1, is a flow diagram illustrating a method 40 for synthesizing a nanoparticle material 32, the method 40 comprising dissolving (42) a metal nitrate 16 in deionized water 18; adding (44) a hydrogel precursor 16 in the deionized water 18 containing the dissolved metal nitrate 16 to create an aqueous solution; heating (46) the aqueous solution 14; cooling (48) the aqueous solution 14 to create a solid gel 26; and calcinating (50) the solid gel 26 to create a metal oxide nanoparticle material 32. The method may comprise cutting the solid gel 26 prior to calcinating (50). The method 40 may be scaled up to a large quantity of grams to tens of grams of materials 32.

Hydrogel 16 may be utilized as a template to produce fast, massive, fine, and highly porous ZnO-based nanoparticle materials 32. The materials 32 may be used as sorbent materials for high temperature (e.g., 400° C. to 500° C.) $H_2S$ desulfurization. In some examples, the embodiments herein may be used for gas phase $H_2S$ desulfurization in jet fuel reformation for fuel cell applications, biomedical applications, optics, electronics, and material science. Porous Ni-doped ZnO nanoparticle material is synthesized in the same manner with the addition of a 4 wt % nickel nitrate precursor. As an example, a solution of 4.0 g $Zn(NO_3)_2.6H_2O$, 0.20 g $Ni(NO_3)_2.6H_2O$ and 0.7 g agarose gel may be prepared by dissolving zinc nitrate and nickel nitrate in 30.0 mL of deionized water followed by the addition of agarose gel.

The embodiments described herein provide a technique to synthesize and characterize pure ZnO and Ni-doped ZnO materials using an agarose gel as a template for $H_2S$ desulfurization. The techniques provided by the embodiments herein result in highly porous network ZnO based sorbent materials (e.g., metal oxide nanoparticle material 32). The phase structure and morphology of the two materials (e.g., metal nitrate 20 and hydrogel precursor 16) may be characterized by X-ray diffraction (XRD), scanning electron microscopy (SEM), transmission electron microscopy (TEM), Brunauer, Emmett and Teller (BET) surface area measurements, and mercury porosimetry.

Generally, the performance of the $H_2S$ desulfurization of the as-synthesized ZnO and Ni-doped ZnO materials versus commercial ZnO may be experimentally compared in a simulated fuel processing operation at 400° C. with an initial $H_2S$ concentration of 400 ppmv. The sulfur adsorption capacity may be demonstrated to be greatly affected by the size and morphology of the nanoparticles 32. An analysis of the desulfurization demonstrates that commercial ZnO exhibits a relatively low saturation capacity of 245 mgS/g while the as-synthesized ZnO in accordance with the embodiments herein has a capacity of 457 mgS/g, which is significantly higher than the commercial ZnO capacity. Moreover, when ZnO is doped with 4 wt % Ni, the sorbent capacity further increases to 730 mgS/g; a nearly three-fold increase over the commercial ZnO capacity. Accordingly, the embodiments herein may be utilized as sorbent materials for high temperature hydrogen sulfide desulfurization requirements. The sorbent sulfidation tests that demonstrate the efficacy of the embodiments herein are described in greater detail below.

An experimental sorbent sulfidation process may be performed at 400° C. in a down flow packed-bed quartz-tube reactor, having an inner diameter of 1.0 cm, with a total amount of 0.10 g sorbent under atmospheric pressure. In an example, analytic grade Airgas® gases from Airgas, Inc. may be utilized to simulate the fuel processing conditions. The selection of the incoming gas mixture stream may vary. In one example, the gas mixture comprises 51% $H_2$, 30% He, 10% water, 8% $CO_2$, and 8% $H_2S$ in a gas cylinder, which includes a mixture of 0.5% $H_2S$ balanced with 99.5% He, introduced at a rate of 100 mL/min. The level of $H_2S$ that exits the sorbent column may be recorded by instruments such as a sulfur analyzer. A condenser may remove the water from the gas mixture stream before it reaches the analyzer.

A Rigaku® Ultima III instrument with $CuK_\alpha$ radiation ($\lambda$=1.5418 Å) may be used to determine the phase(s) of the samples using powder X-ray diffraction (PXRD). The analysis of the crystallite size may occur by collecting diffraction data in a Bragg-Brentano configuration. It may be practical to correct for instrumental broadening by using $LaB_6$ (NIST; 660A). A scan rate of 1.0 degree (2θ) per minute may be used for performing the measurements and each diffraction data point may be collected at an interval of 0.02 degree (2θ), as an example, for the total spectrum range of 20-80 degree (2θ). A Fei Quanta 200 F scanning electron microscope (SEM) may be used to observe the morphology of the sorbent material. A Micromeritics® TriStar II analyzer using $N_2$ gas as the adsorbate at 77.3K may be utilized to measure the Brunauer, Emmett and Teller (BET) surface areas of the sorbent sample(s). Next, adsorption/desorption isotherm measurements may be collected in a relative pressure range $P/P_0$ from approximately 0.05 to 1.0, in an example.

A degassing step may occur next, wherein the samples may be degassed at approximately 200° C. for several hours prior to conducting the adsorption analysis. A Quantachrome® mercury intrusion analyzer PM 60 in a pressure range from 0.2 psi to 60000 psi may be used to examine the macroporous structures of the samples. Another degassing step may occur next, whereby the samples may be degassed under vacuum at approximately 200° C. for six hours before subsequent analysis. A JEOL® 2100 F microscope operating at 200 kV may be used to perform transmission electron microscopy (TEM) and scanning transmission electron microscopy (STEM) on the samples. In one example, the samples may be prepared by performing sonication in ethanol for approximately three minutes before drop casting the samples on a TEM grid covered with a holey carbon film. Thereafter, a JEOL® BF detector may be used to obtain a bright field (BF) STEM image of the samples. A Gatan® system may then be used to collect the energy dispersive spectroscopy (EDS) mapping of the particles on a BF image.

Figure 3:
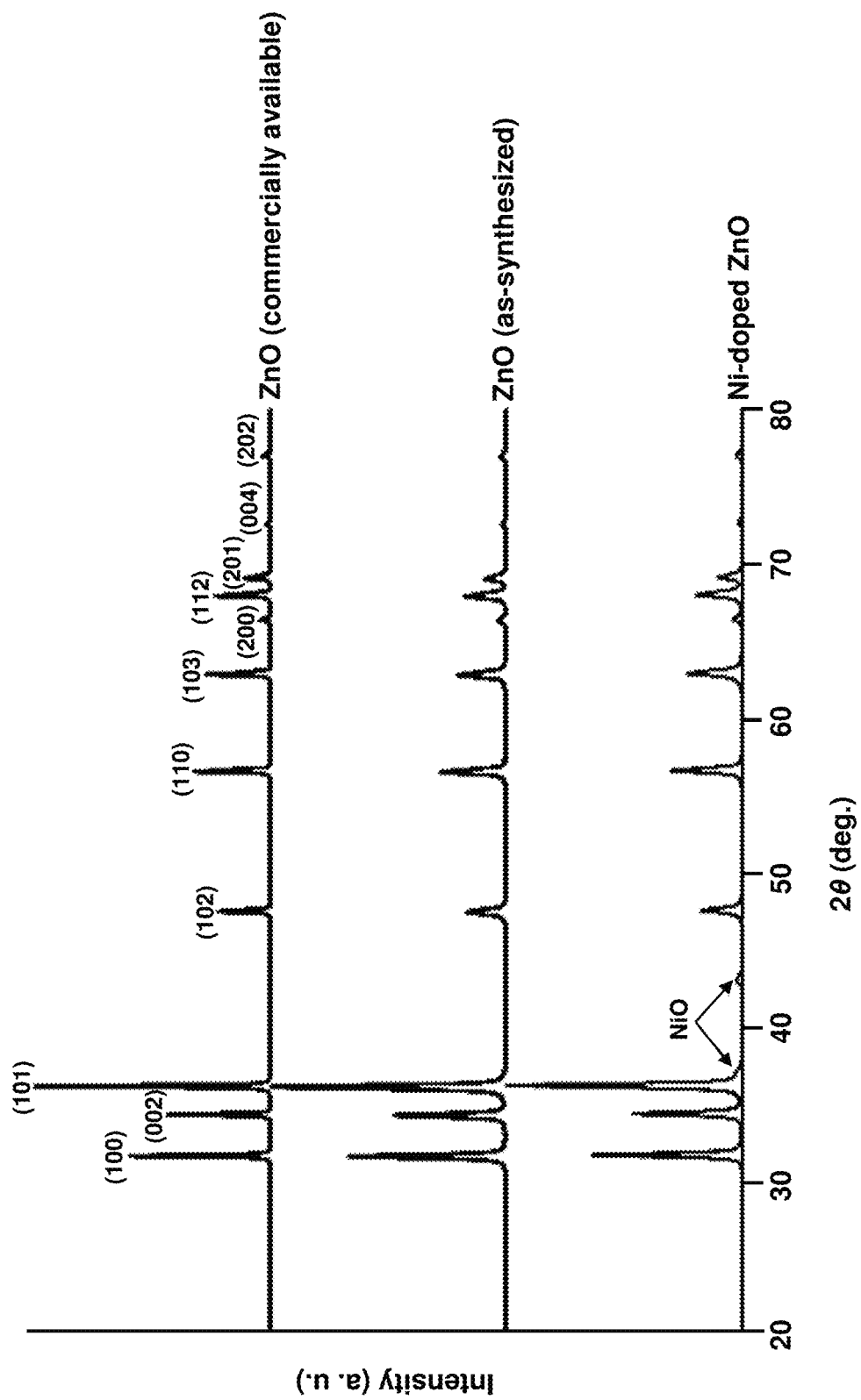
FIG. 3 is a graph illustrating X-ray diffraction (XRD) patterns of commercial ZnO, as-synthesized ZnO, and Ni-doped ZnO.

To compare samples, porous pure ZnO and Ni-doped ZnO are synthesized using agarose gel as a template, in accordance with the techniques provided by the embodiments herein. These as-synthesized samples are compared with a commercially available pure zinc oxide ZnO sample, which is used as a reference sorbent for the experimental comparison(s). As shown in FIG. 3, the PXRD pattern of the commercial ZnO and the as-synthesized ZnO is indexed as pure phase ZnO. In FIG. 3, the broadened line width of the as-synthesized ZnO and Ni-doped ZnO in the PXRD patterns suggests that the crystallite size is smaller than the crystallite size of commercial ZnO particles. Additionally, ZnO doped with 4 wt % Ni exhibits a slightly different PXRD pattern. The PXRD pattern of the ZnO doped with 4 wt % Ni generally retains the profile of the pure ZnO except for the very small NiO peaks indexed at approximately 2θ=37° and 43°. This suggests that there is uniform dispersion of the NiO nanoparticles across the ZnO particle. In fact, this dispersion may be confirmed by TEM analysis.

The measurement of the broadening of the X-ray reflections allows one to estimate the average crystallite size for the ZnO-based materials. The Scherrer equation provides:

$$t = \frac{0.9\lambda}{\beta \cos\theta}$$

where t is the thickness of the crystallite size in angstroms, $\lambda$ is the wavelength of the radiation, $\beta$ is the line broadening, and $\theta$ is the Bragg angle. The Warren equation helps to derive $\beta$:

$$\beta^2 = \beta_M^2 - \beta_S^2$$

using $LaB_6$ as the line broadening standard, where $\beta_M$ is the sample peak full width half maximum (FWHM) and $\beta_S$ is the FWHM of the $LaB_6$. A crystallite size may be determined from these measurements, as provided in Table 1.

TABLE 1

PXRD data

| Material | 2θ (°) | $d_{(101)}$ spacing (Å) | FWHM (°) | Crystallite size[a] (nm) |
|---|---|---|---|---|
| Commercial ZnO | 36.214 | 2.4785 | 0.127 | 106.14 |
| As-synthesized ZnO | 36.198 | 2.4796 | 0.257 | 35.31 |
| Ni-doped ZnO | 36.253 | 2.4759 | 0.249 | 36.66 |

[a]Crystallite size calculated using Scherrer equation

Figure 4A:
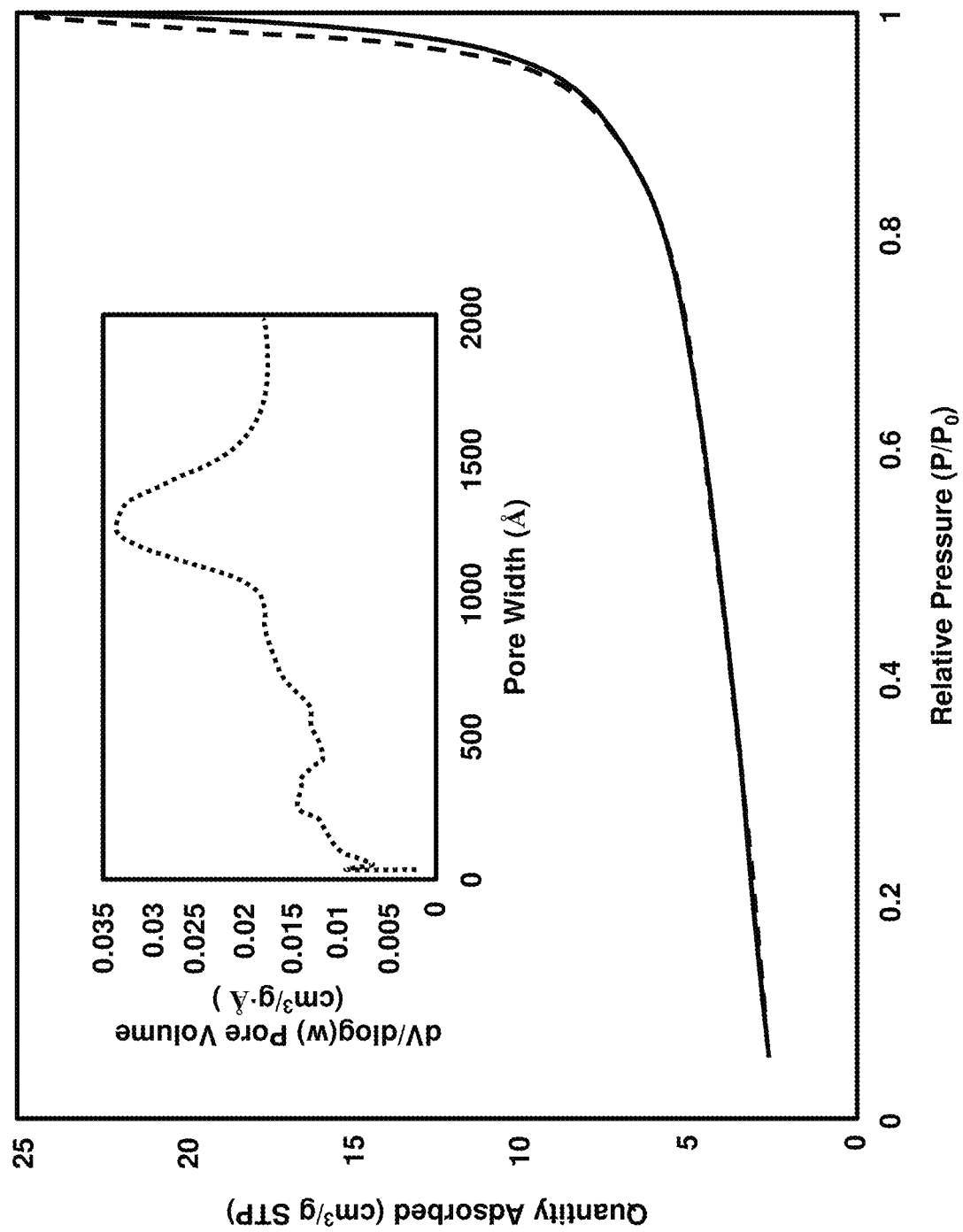
FIG. 4A is a graph illustrating $N_2$ adsorption and desorption isotherms for as-synthesized ZnO with the inset depicting the pore size distribution.
Figure 4B:
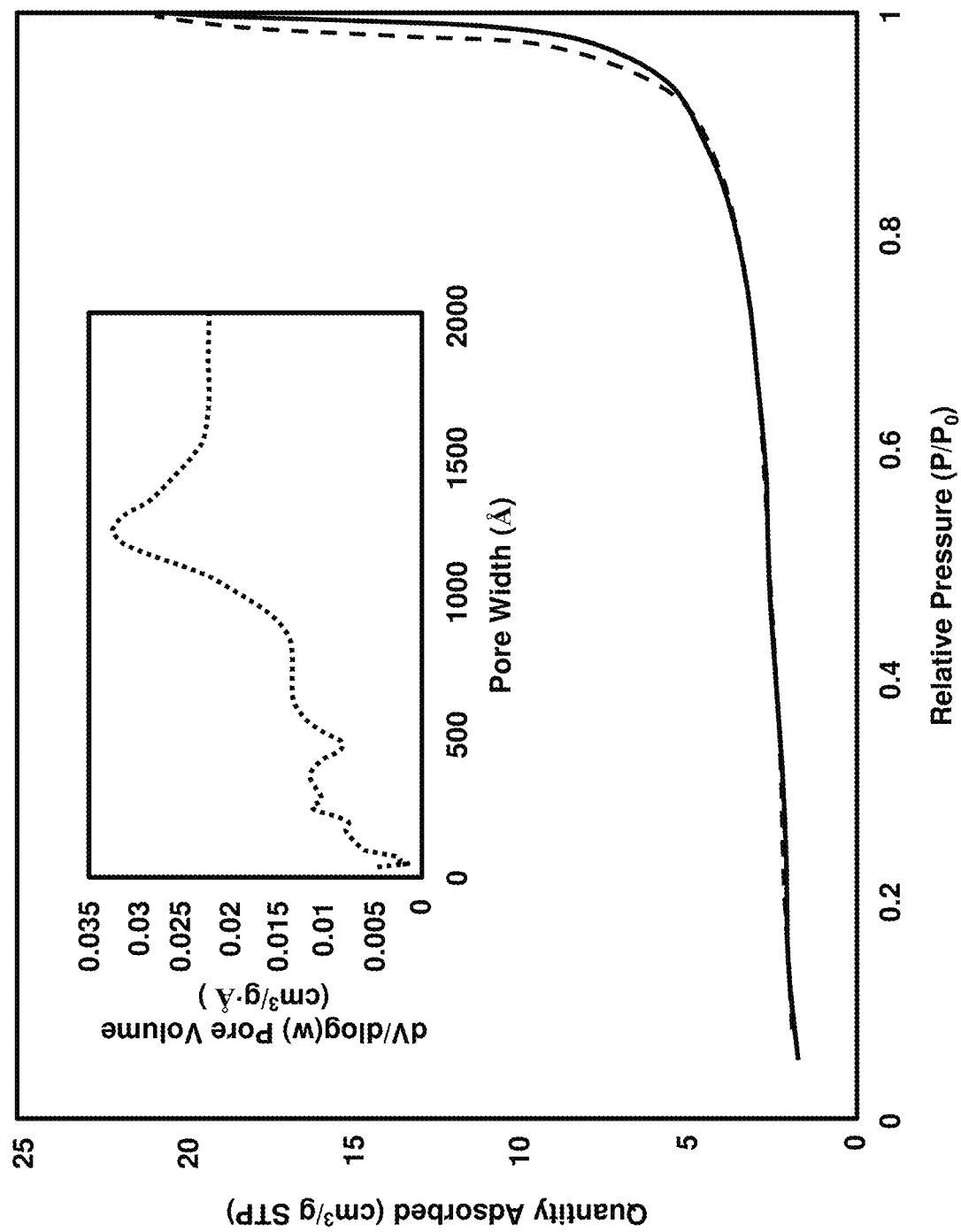
FIG. 4B is a graph illustrating $N_2$ adsorption and desorption isotherms for as-synthesized Ni-doped ZnO with the inset depicting the pore size distribution.

FIGS. 4A and 4B illustrate the $N_2$ sorption and sorption isotherms of these materials being closest to the IUPAC classification of a type IV isotherm with an H3 hysteresis loop, which are characteristics of a mesoporous material. In FIGS. 4A and 4B, the solid curve depicts adsorption while the dashed curve depicts desorption. FIG. 4A is a graph illustrating $N_2$ adsorption and desorption isotherms for as-synthesized ZnO with the inset in the graph depicting the pore size distribution, and FIG. 4B is a graph illustrating $N_2$ adsorption and desorption isotherms for as-synthesized Ni-doped ZnO with the inset in the graph depicting the pore size distribution. The high slope of the adsorption isotherms near saturation suggests further pore filling is occurring, wherein the materials may have pores in the macropore size range (i.e., >500 Å), which are outside the limits of detection by the gas adsorption method. BET analysis of the surface area of the sorbent materials is detailed in Table 2.

TABLE 2

Surface area of sorbents measured by BET and adsorption capacities using 400 ppmv $H_2S$ gas

| Material | Surface area (m²/g) | BJH pore volume[a] (cm³/g) | Adsorption capacity (mgS/g) |
|---|---|---|---|
| Commercial ZnO | 1.5 | — | 245.2 |
| As-synthesized ZnO | 10.2 | 0.029 | 457.3 |
| Ni-doped ZnO | 6.8 | 0.025 | 730.0 |

[a]BJH (Barrett-Joyner-Halenda) adsorption pore volume

As Table 2 indicates, the commercial ZnO has a relatively low surface area of 1.5 m²/g, which may be as a result of its relatively negligible porosity, larger crystallites, and high density. Conversely, the pure as-synthesized ZnO comprises a relatively higher surface area of 10.2 m²/g; nearly seven times greater than the commercial ZnO value. The higher surface area of the as-synthesized ZnO material may be attributed to the macroscale porosity that exists through the entire particle structure. When ZnO is doped with 4 wt % Ni, the surface area is found to be 6.8 m²/g, but it still retains its relatively high porosity compared with the commercial ZnO. The pore volume and pore size of the as-synthesized ZnO and Ni-doped ZnO may be determined using BJH calculations from the $N_2$ isotherms (illustrated in FIGS. 4A and 4B). The as-synthesized ZnO is calculated to have a pore volume of 0.029 cm³/g and the as-synthesized Ni-doped ZnO is calculated to have a pore volume of 0.025 cm³/g. The inset graphs in FIGS. 4A and 4B provide a comparison of the pore size distribution. These inset graphs demonstrate that both materials (e.g., as-synthesized ZnO and Ni-doped ZnO) have a similar pore size distribution from a mesopore of approximately 3 nm to a macropore of approximately greater than 50 nm. In embodiments, macropore size may range from 50 nm to 1000 nm. Indeed, the results of the pore size distribution correspond well to the SEM analyses. The analysis of the macroporous structures may be limited by $N_2$ sorption isotherms. However, the macroporous structure of the samples may be additionally examined using mercury porosimetry analysis.

Figure 4C:
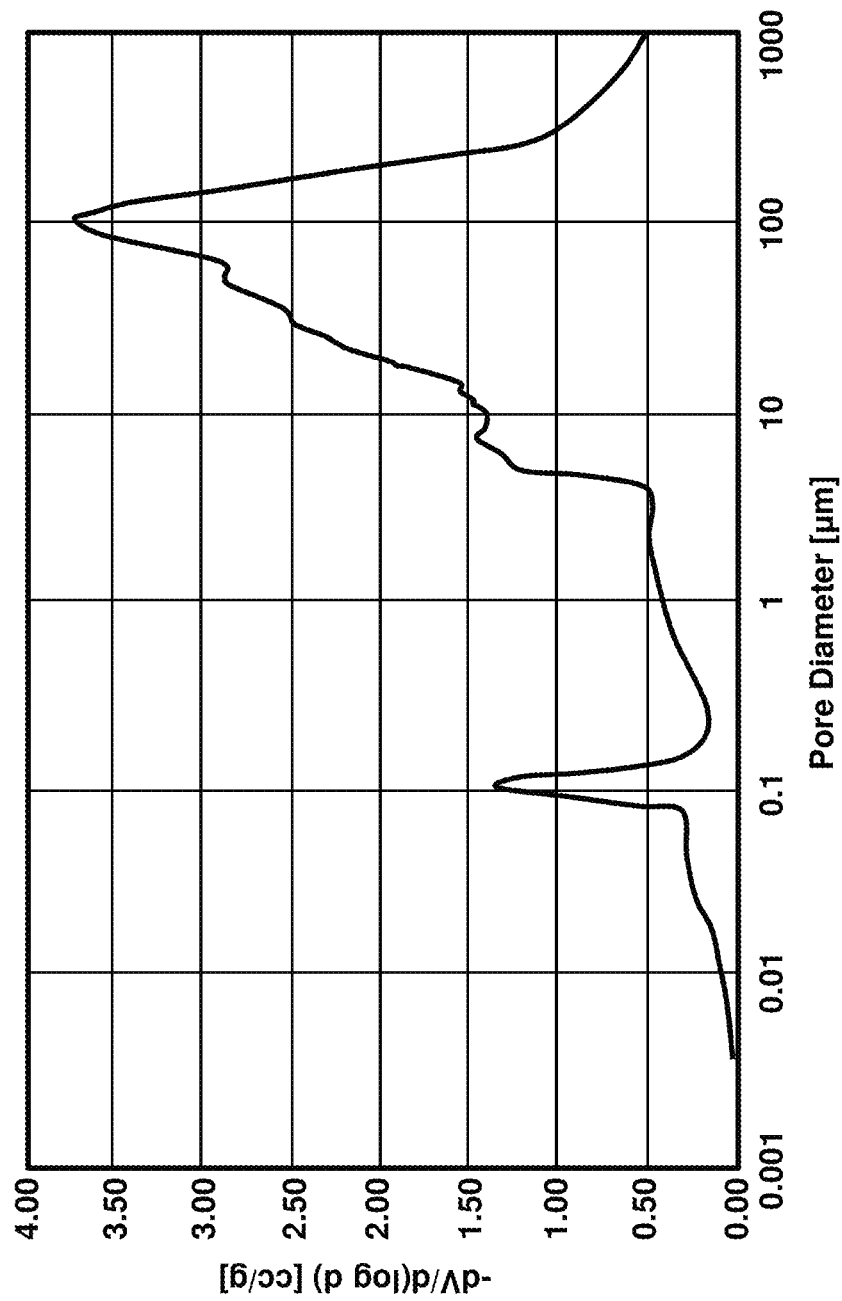
FIG. 4C is a graph illustrating a mercury intrusion analysis for microporous structures of as-synthesized ZnO.
Figure 4D:
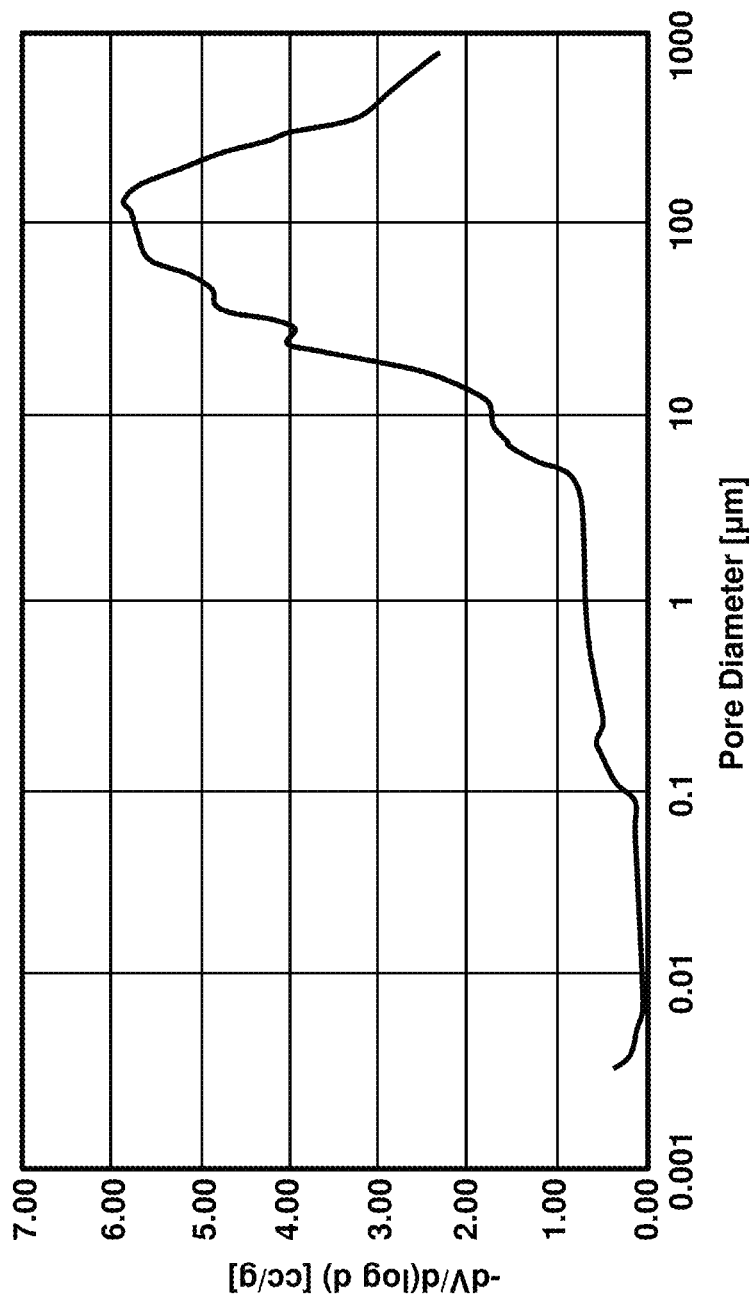
FIG. 4D is a graph illustrating a mercury intrusion analysis for microporous structures of as-synthesized Ni-doped ZnO.

FIG. 4C is a graph illustrating a mercury intrusion analysis for microporous structures of as-synthesized ZnO, and FIG. 4D is a graph illustrating a mercury intrusion analysis for microporous structures of as-synthesized Ni-doped ZnO. According to FIG. 4C, the bimodal pore size distribution of the sample may be obtained for the as-synthesized ZnO sample using mercury porosimetry. The first peak in FIG. 4C represents the mode pore diameter of 0.105 μm while the second peak, occurring at approximately 100 μm, may be a result of inter-particle intrusion. The total surface area of as-synthesized ZnO is calculated to be approximately 14.0 m²/g. The mode pore diameter value of the Ni-doped ZnO is approximately 122.5 μm, as given in FIG. 4D. However, this value may not represent the actual pore size because of the inter-particle voids undergo filling. The Ni-doped ZnO comprises a total surface area of approximately 11.6 m²/g.

Figure 5A:
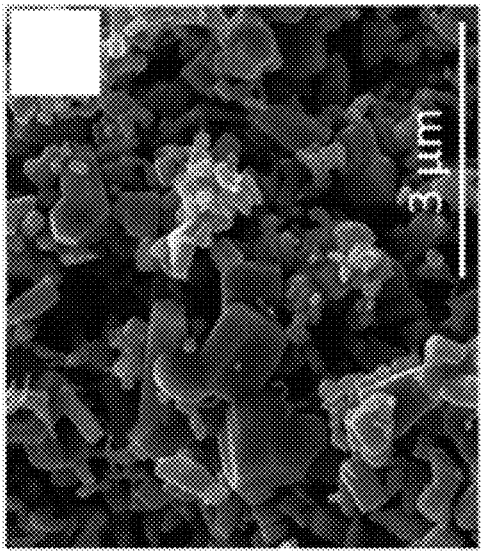
FIG. 5A is a scanning electron microscope (SEM) image of commercial ZnO.
Figure 5B:
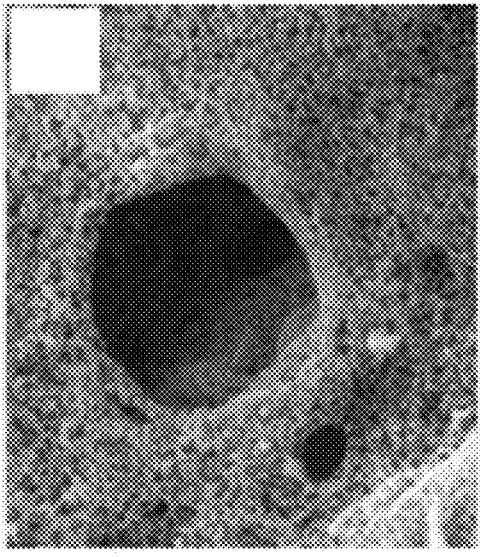
FIG. 5B is a SEM image of as-synthesized porous ZnO.
Figure 5C:
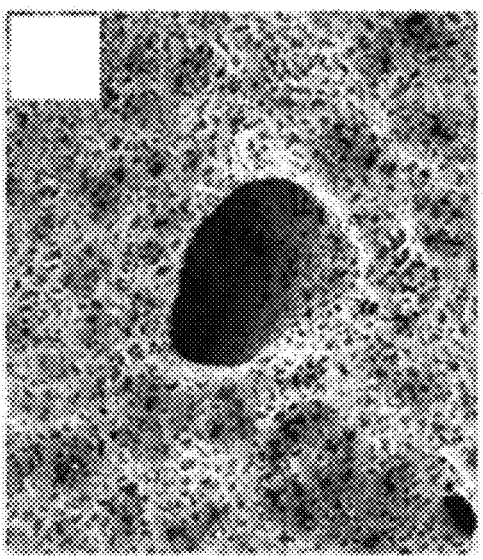
FIG. 5C is a SEM image of as-synthesized Ni-doped ZnO.

FIGS. 5A through 5C are SEM images of commercial ZnO, the as-synthesized ZnO, and the as-synthesized Ni-doped ZnO, respectively. The 3 μm scale bar is the same for all three images in FIGS. 5A through 5C. The SEM images reveal the different morphologies between commercial ZnO and the as-synthesized ZnO based materials after a calcination process at approximately 600° C. in air to remove the agarose template. The SEM image of the commercial ZnO shown in FIG. 5A reveals a bulk powder having cube-like or rod-like particles in the submicron to micron range. Conversely, the SEM images of the as-synthesized ZnO shown in FIG. 5B and the Ni-doped ZnO shown in FIG. 5C comprise sponge-like materials containing a highly porous network structure with an interconnected mesopore/macropore hybrid.

TEM and STEM analysis may be utilized to further evaluate the as-synthesized ZnO and Ni-doped ZnO samples. FIG. 6A is a TEM image of as-synthesized ZnO, and FIG. 6B is a TEM image of as-synthesized Ni-doped ZnO. For imaging and compositional analysis purposes, the samples may be formed into small particles by sonication. The as-synthesized ZnO comprises spherical nanoparticles having diameters of approximately 30 nm to 100 nm. The Ni-doped ZnO samples shown in FIG. 6B comprise ZnO particle sizes that are slightly increased, wherein the nickel is uniformly dispersed across the ZnO nanoparticle sample. Small clusters are visible throughout the nanoparticle, with the largest being approximately 20 nm in diameter, and with the majority of discernible clusters being less than approximately 10 nm.

Figure 7:
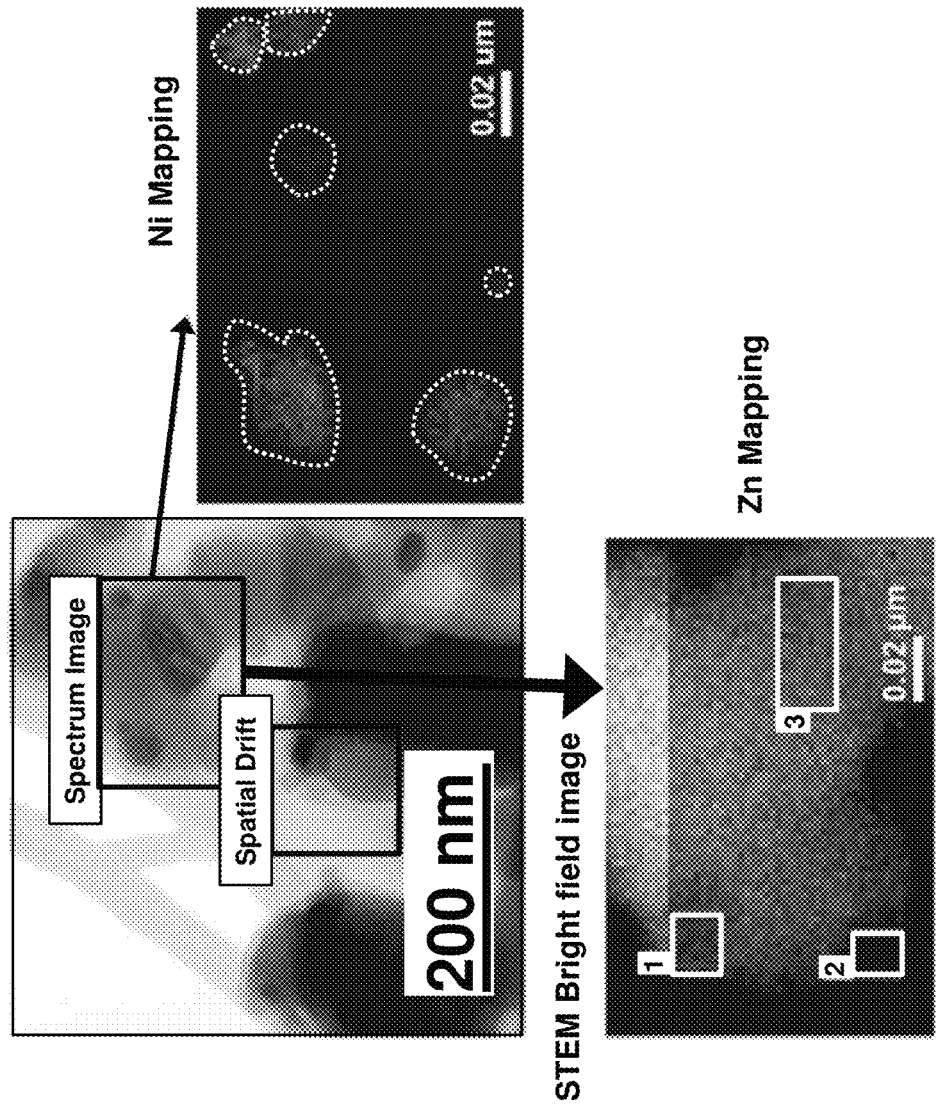
FIG. 7 is a scanning transmission electron microscope (STEM) bright field image with energy dispersive spectroscopy (EDS) elemental analysis of Ni-doped ZnO using agarose gel as a template.

FIG. 7 is a STEM BF image with EDS elemental analysis of Ni-doped ZnO using agarose gel as a template. Here, EDS may be performed on a STEM BF image of Ni-doped ZnO to further examine the composition of the associated particles. FIG. 7 illustrates that small particles on the surface of the big particle generally include Ni while the big particle generally contains Zn. By combining the observations of FIG. 6B and FIG. 7, it may be observed that nickel particles with a smaller size are uniformly dispersed on the surface of the larger ZnO nanoparticles.

Figure 8:
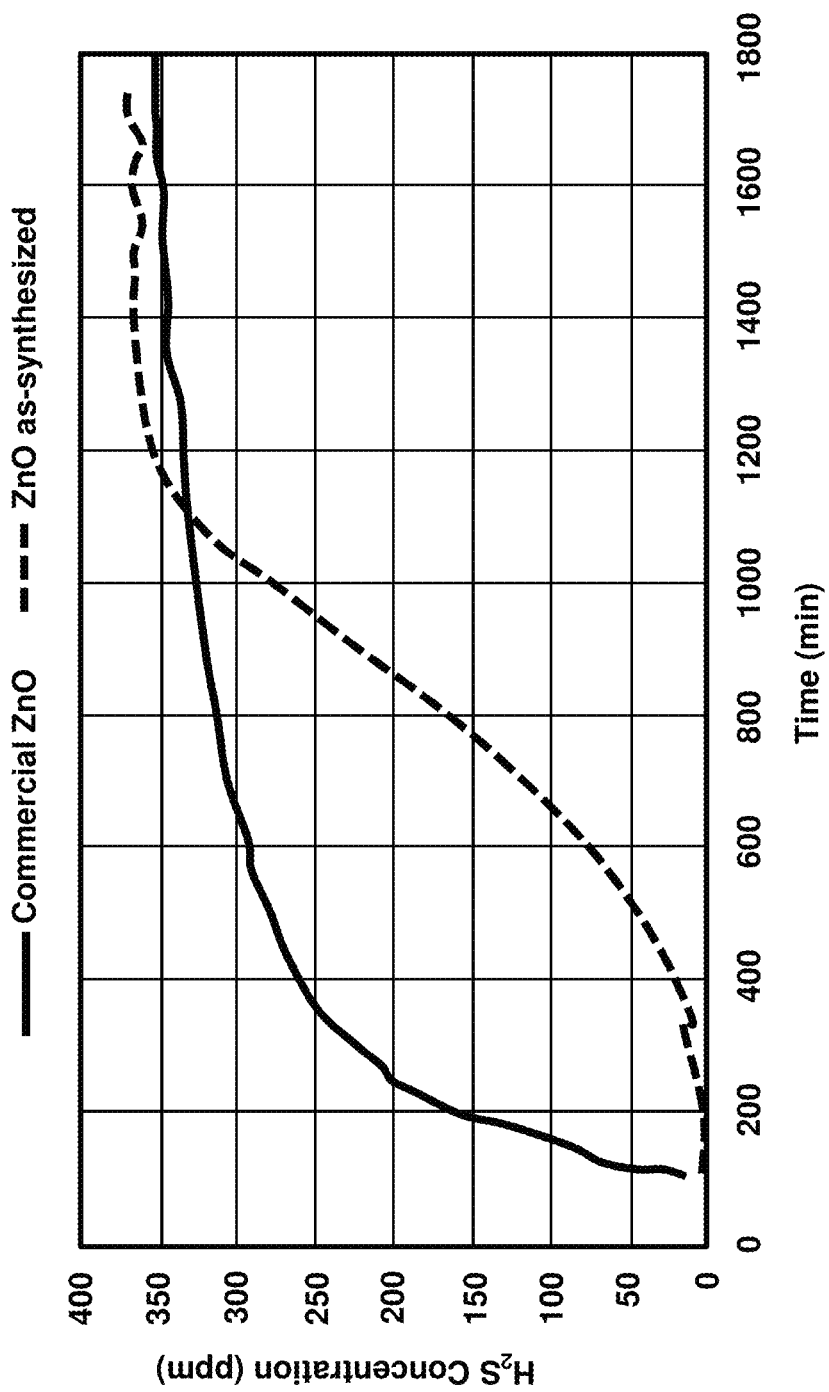
FIG. 8 is a graph illustrating the outlet $H_2S$ concentration as a function of time for commercial ZnO and as-synthesized ZnO.

The sulfidation performance of the samples, as provided in Table 2, is defined as a milligram of sulfur adsorbed per gram of adsorbent (mgS/g). FIG. 8 is a graph illustrating the outlet $H_2S$ concentration as a function of time for commercial ZnO and as-synthesized ZnO. More particularly, FIG. 8 illustrates the results of sulfur removal obtained by the weight of 0.1 g of each sample at approximately 400° C. with an incoming $H_2S$ concentration of 400 ppmv as one of the simulated gas mixture conditions (water, $H_2S$, $H_2$, He, and $CO_2$). Table 2 summarizes the surface area and adsorption capacity of the sorbents. From the data, one may calculate the sulfur capacity by integrating, under the curve of sulfur, removal data and normalizing per unit mass. FIG. 8 shows the results of $H_2S$ desulfurization wherein commercial ZnO exhibits a relatively low sulfur removal capacity of 245.2 mgS/g sorbent as it quickly uptakes $H_2S$ and reaches the saturation point fast. However, the as-synthesized ZnO has a relatively much higher sulfur uptake capacity of 457.3 mgS/g, which is nearly a two-fold increase compared with the commercial ZnO value as it significantly extends the uptake curve and rises at a generally slower rate to the saturation point. The greater $H_2S$ desulfurization results achieved by the as-synthesized ZnO may attributed to its nanoparticle morphology and porosity, which makes its surface more active as compared to commercial ZnO in micron particle size samples.

Figure 9:
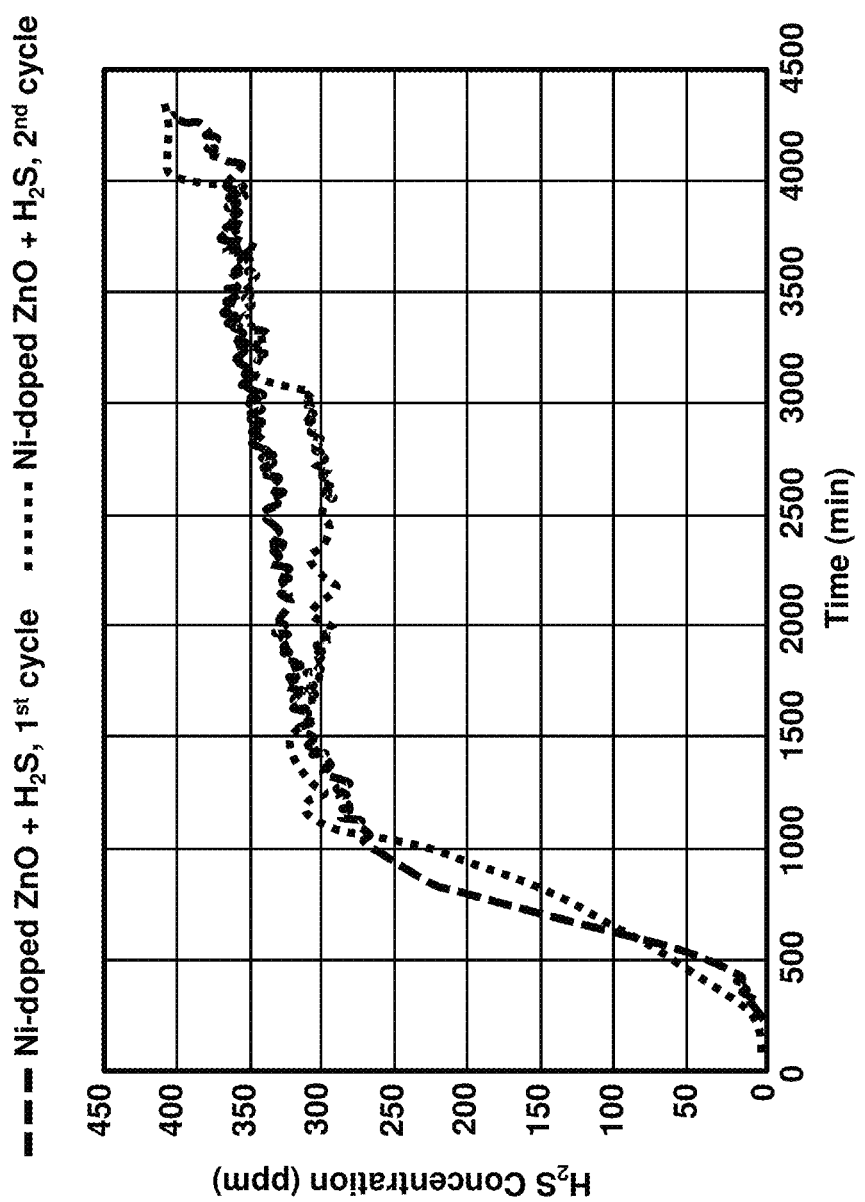
FIG. 9 is a graph illustrating the outlet $H_2S$ concentration as a function of time Ni-doped ZnO ($1^{st}$ cycle) and regeneration after calcination at 600° C. in air ($2^{nd}$ cycle)

Moreover, when ZnO is doped with 4 wt % Ni, the sulfur adsorption is improved even more to a higher capacity of 730.0 mgS/g. FIG. 9 is a graph illustrating the outlet $H_2S$ concentration as a function of time Ni-doped ZnO ($1^{st}$ cycle) and regeneration after calcination at 600° C. in air ($2^{nd}$ cycle). This improvement in capacity may be attributed to the addition of a small amount of Ni (4 wt %) nanoparticles doped onto the ZnO structure. Furthermore, when ZnO is doped with more than 4 wt % Ni, the sulfur removal capacity decreases to about 300 mgS/g. After sulfidation for the $1^{st}$ cycle, the sample may be regenerated in air at approximately 600° C. for five hours and a $2^{nd}$ cycle of the sample is run. The results demonstrate that Ni-doped ZnO sorbent material may be regenerated with 100% sulfur removal capacity of its $1^{st}$ cycle, and by adding promoters such as Ni and other transition metals to the sorbents, the regeneration properties of the sorbent materials may be further improved.

Figure 10:
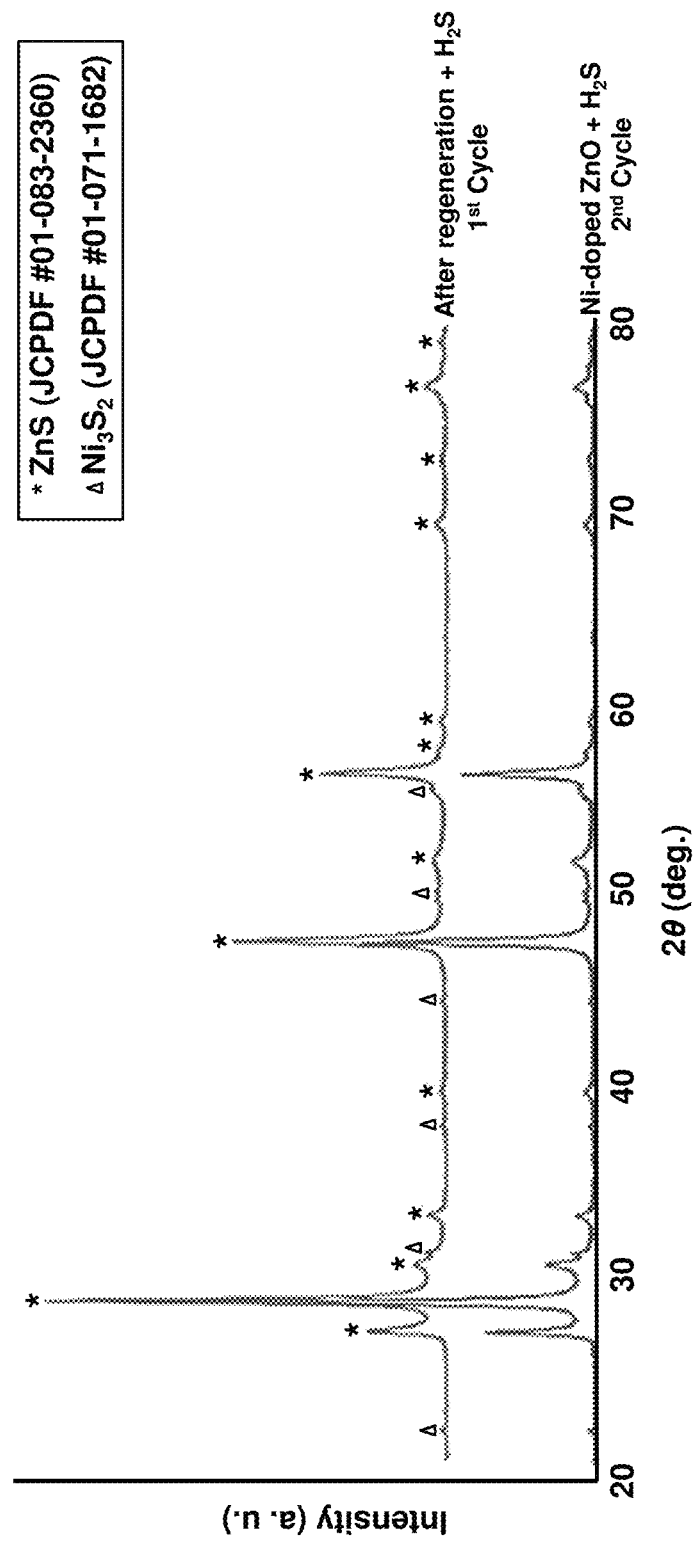
FIG. 10 is a graph illustrating XRD patterns of Ni-doped ZnO after $H_2S$ desulfurization for $1^{st}$ cycle and $2^{nd}$ cycle after regeneration.

FIG. 10 is a graph illustrating XRD patterns of Ni-doped ZnO after $H_2S$ desulfurization for the $1^{st}$ cycle and $2^{nd}$ cycle after regeneration. For this analysis, the 4 wt % Ni-doped ZnO sample is examined with XRD after the $1^{st}$ and $2^{nd}$ sulfur adsorption cycles. FIG. 10 illustrates the resulting phase structures. As shown, there is a consistent mixture of products for the Ni-doped ZnO samples post $H_2S$ exposure for both cycles. Here, ZnS (as indexed to JCPDF #01-083-2360) and $Ni_3S_2$ (as indexed to JCPDF #01-071-1682) are identified. From the XRD patterns depicted in FIG. 10, the following reactions provided in Eq. (1) and Eq. (2) are given:

$$ZnO + H2S \leftrightarrow ZnS + H_2O \quad (1)$$

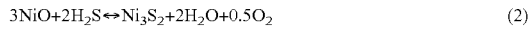

$$3NiO + 2H_2S \leftrightarrow Ni_3S_2 + 2H_2O + 0.5O_2 \quad (2)$$

By adding Ni to ZnO, the $H_2S$ adsorption is further enhanced due to NiO nanoparticles being well dispersed on the ZnO structure, which may create additional active sites for reacting with the $H_2S$. Moreover, Eq. (1) and Eq. (2) further confirm this as well as the observations provided by the XRD analyses.

In accordance with the embodiments herein, porous ZnO and Ni-doped ZnO templated by agarose gel may be used as materials for removing $H_2S$ gas. The embodiments herein create networked and highly porous sorbent nanoparticles 32 that comprise an interconnected mesopore/macropore hybrid structure throughout the particle 32. TEM analysis demonstrates that porous ZnO comprising of ZnO nanoparticles 32 throughout the structure and Ni-doped ZnO contains NiO nanoparticles 32 that are uniformly dispersed across the ZnO nanoparticles 32. Moreover, the saturation adsorption capacity of the as-synthesized ZnO in accordance with the embodiments herein is almost double as compared to commercial ZnO. When doping ZnO with 4 wt % Ni, the sample material comprises a saturation adsorption capacity of 730 mgS/g, which is nearly a three-fold increase compared to commercial ZnO. Additionally, the ZnO with 4 wt % Ni is regenerated by heat in air, and retains 100% of its initial $H_2S$ adsorption capacity. Accordingly, the synthesized method 40 provided by the embodiments herein creates porous materials tailored to applications including gas adsorption, catalysis and separation. Specifically, desulfurization of $H_2S$ is an important step in fuel processing technology.

The embodiments herein enable the long-term stability of type III/V material-based strained layer superlattice infrared detectors, composite materials, semiconductors, multi junction photovoltaic cells, transistors, bioinformatics, biosensors, thermovoltaics, chemical sensors, etc. The embodiments herein may produce various types of highly porous metal oxide-based nanoparticle materials 32 without using expensive equipment or expensive organic solvents, which helps reduce manufacturing cost and complexity. The one-pot synthesis provided by the embodiments herein may be performed in a relatively short period of time; just a few hours in duration.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for synthesizing a nanoparticle material, the method comprising:
    dissolving a metal nitrate in deionized water;
    adding a hydrogel precursor comprising an agarose gel in the deionized water containing the dissolved metal nitrate;
    dissolving an approximately 4 wt % nickel nitrate precursor in the deionized water with the metal nitrate and the hydrogel precursor to create an aqueous solution;
    heating the aqueous solution to a boil;
    cooling the aqueous solution to create a solid gel;
    cutting the solid gel; and
    calcinating the solid gel at approximately 600° C. for approximately five hours in the presence of air to create a zinc oxide-based nanoparticle material.

2. The method of claim 1, comprising cooling the aqueous solution at room temperature.

* * * * *